(12) United States Patent
Davis et al.

(10) Patent No.: US 6,340,170 B1
(45) Date of Patent: Jan. 22, 2002

(54) ACTUATABLE KNEE BOLSTER

(75) Inventors: Michael B. Davis, Clarkston; Garry Hayes, Rochester Hills, both of MI (US)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 0 days.

(21) Appl. No.: 09/536,942

(22) Filed: Mar. 28, 2000

(51) Int. Cl.⁷ ............................................. B60R 21/22
(52) U.S. Cl. .................. 280/730.1; 280/753; 280/728.3
(58) Field of Search .............................. 280/752, 728.2, 280/748, 728.3, 730.1, 753; 296/35.2

(56) References Cited

U.S. PATENT DOCUMENTS

| | | | |
|---|---|---|---|
| 5,458,366 A | * 10/1995 | Hock et al. | 280/729 |
| 5,536,043 A |   7/1996 | Lang et al. | |
| 5,588,666 A | * 12/1996 | Numata | 280/728.2 |
| 5,651,562 A | *  7/1997 | Hagen et al. | 280/728.3 |
| 5,775,729 A | *  7/1998 | Schneider et al. | 280/730.1 |
| 5,813,693 A | *  9/1998 | Gordon et al. | 280/728.3 |

* cited by examiner

Primary Examiner—Lanna Mai
Assistant Examiner—Christopher Buchanan
(74) Attorney, Agent, or Firm—Tarolli, Sundheim, Covell, Tummino & Szabo L.L.P.

(57) ABSTRACT

An apparatus (10) for helping to protect an occupant of a vehicle having an instrument panel (12) includes a knee bolster (30) movable in the vehicle from a stored position adjacent the instrument panel to a blocking position spaced apart from the instrument panel. The knee bolster (30) has at least one fastener opening (62) and a tear seam (70) extending around the fastener opening. The tear seam (70) defines and encloses a securing portion (72) of the knee bolster (30). A fastener (76) releasably maintains the knee bolster (30) in the stored position adjacent to the instrument panel (12). The fastener (76) extends through the fastener opening (62) in the knee bolster (30) and overlies the securing portion (72) of the knee bolster. The knee bolster (30) ruptures at the tear seam (70) in response to movement of the knee bolster from the stored position to the blocking position. The securing portion (72) of the knee bolster (30) remains secured to the instrument panel (12) by the fastener (76) when the knee bolster moves from the stored position.

15 Claims, 2 Drawing Sheets

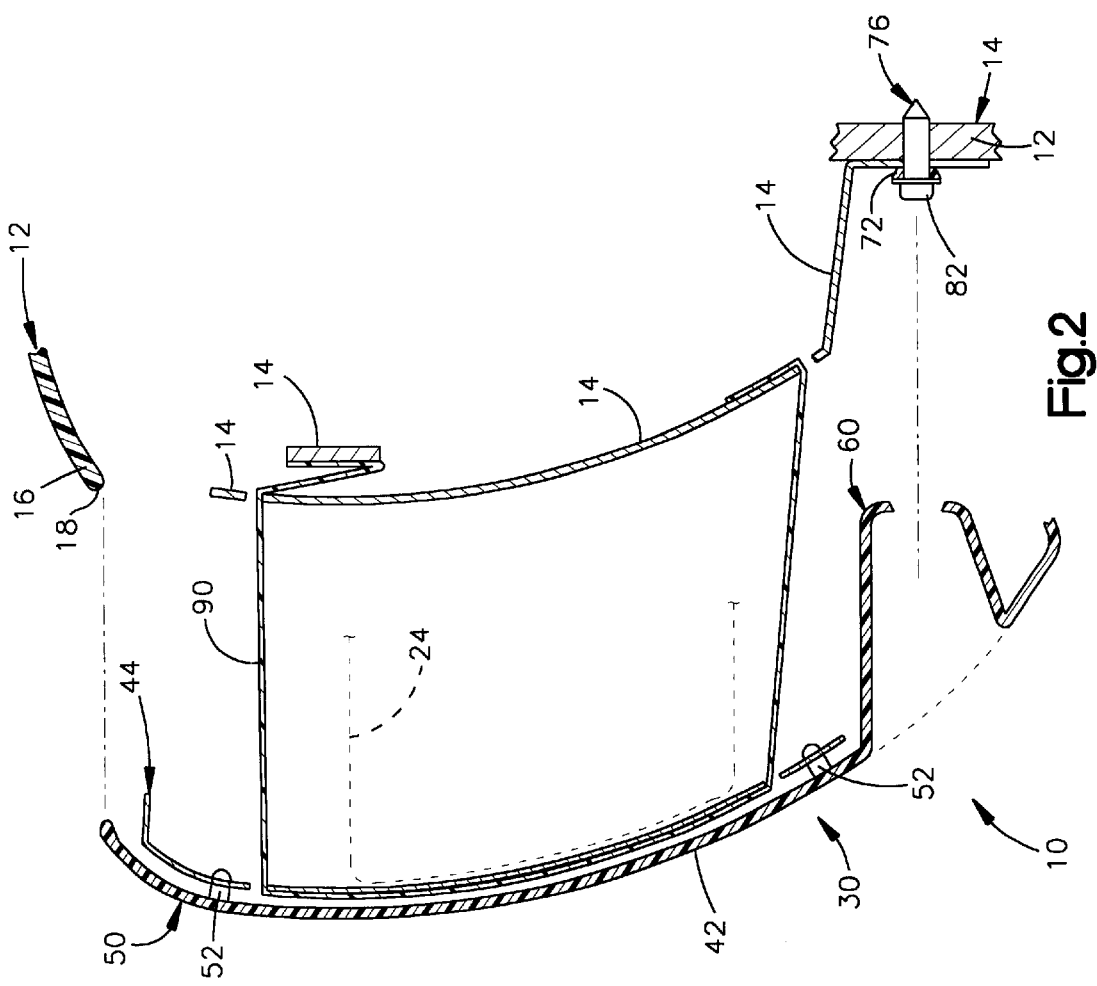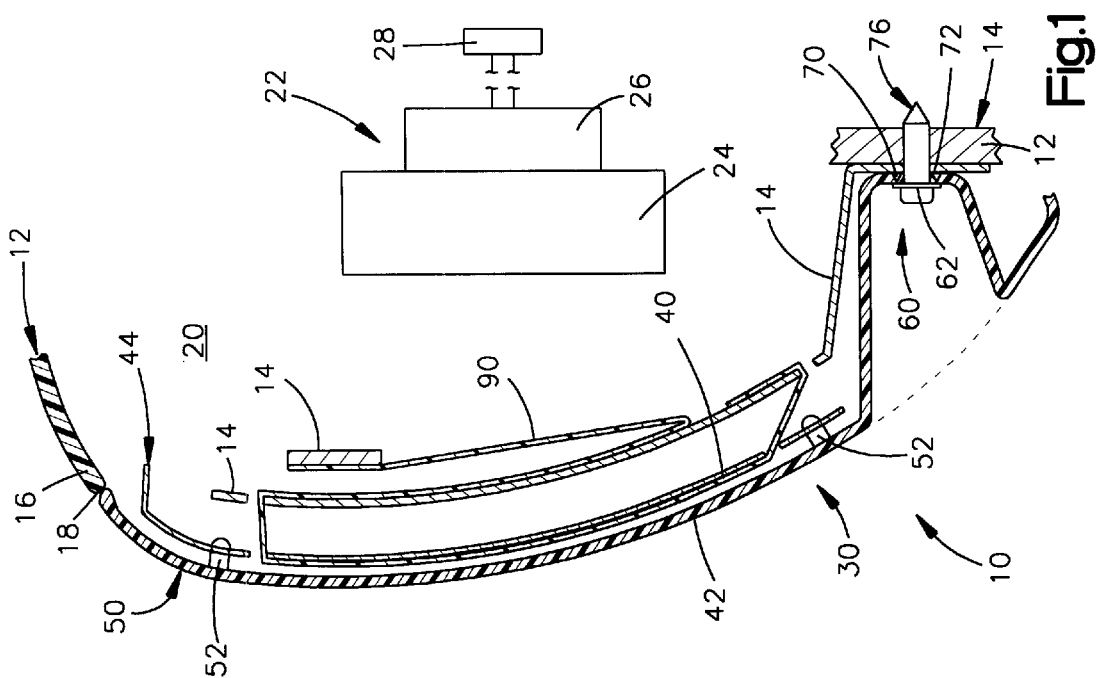

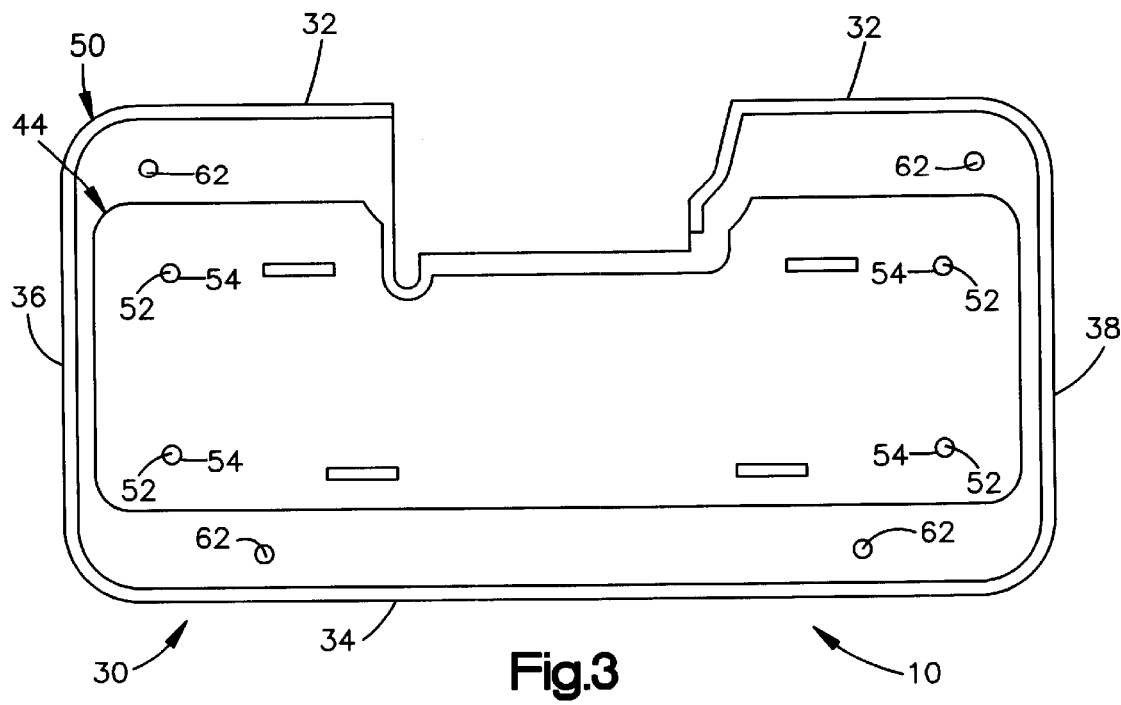
Fig.3
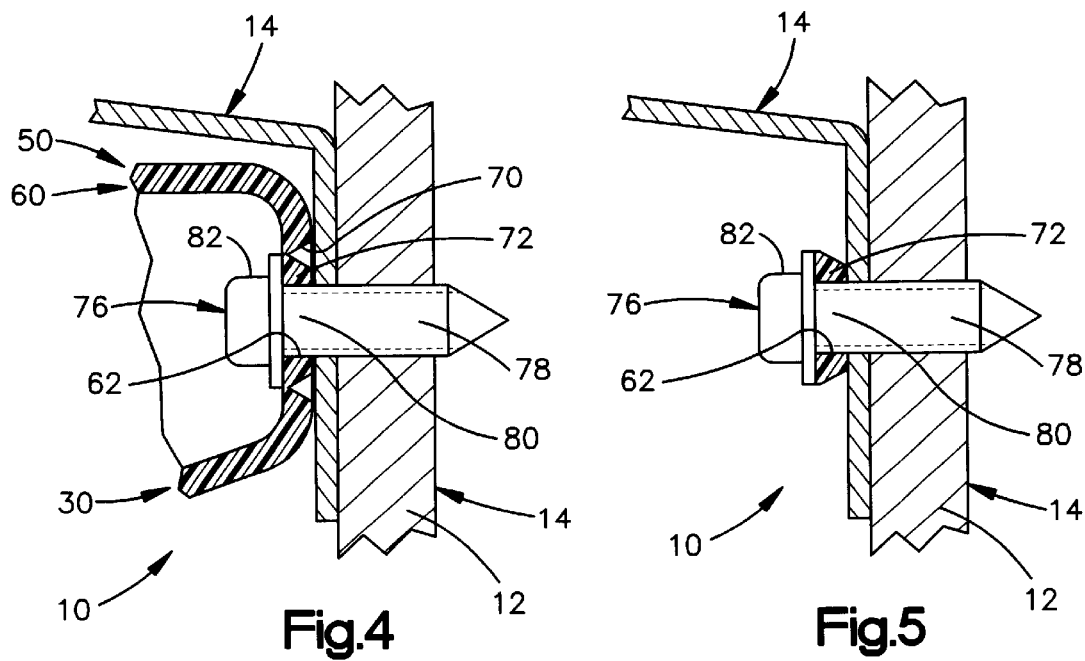
Fig.4
Fig.5

ACTUATABLE KNEE BOLSTER

BACKGROUND OF THE INVENTION

1. Technical Field

The present invention relates to an apparatus for helping to protect an occupant of a vehicle. In particular, the present invention relates to an apparatus including a knee bolster movable from a stored position adjacent an instrument panel of the vehicle to a blocking position spaced apart from the vehicle instrument panel.

2. Description of the Prior Art

Actuatable vehicle occupant knee bolsters are known in the art. The knee bolster is located at a lower portion of a vehicle instrument panel and is movable from a stored position to a blocking position in response to detection of a vehicle crash condition. The knee bolster can help to prevent the vehicle occupant from "submarining" underneath an inflated air bag. Knee bolster systems have been developed that use an inflatable device, such as an air bag, for moving the knee bolster.

SUMMARY OF THE INVENTION

The present invention is an apparatus for helping to protect an occupant of a vehicle having an instrument panel. The apparatus comprises a knee bolster movable in the vehicle from a stored position adjacent the instrument panel of the vehicle to a blocking position spaced apart from the vehicle instrument panel. The knee bolster has at least one fastener opening and a tear seam extending around the fastener opening. The tear seam defines and encloses a securing portion of the knee bolster. A fastener releasably maintains the knee bolster in the stored position adjacent to the instrument panel. The fastener extends through the fastener opening in the knee bolster and overlies the securing portion of the knee bolster. The knee bolster ruptures at the tear seam in response to movement of the knee bolster from the stored position to the blocking position. The securing portion of the knee bolster remains secured to the instrument panel by the fastener when the knee bolster moves from the stored position.

BRIEF DESCRIPTION OF THE DRAWINGS

The foregoing and other features of the present invention Sill become apparent to one skilled in the art to which the present invention relates upon consideration of the following description of the invention with reference to the accompanying drawings, in which:

FIG. 1 is a schematic view, partially in section, of a vehicle occupant protection apparatus in accordance with the present invention, including a knee bolster shown in a stored condition;

FIG. 2 is a view similar to FIG. 1 showing the knee bolster in an actuated or blocking condition;

FIG. 3 is a rear elevational view of a portion of the knee bolster of FIG. 1;

FIG. 4 is an enlarged view of a portion of FIG. 1; and

FIG. 5 is an enlarged view of a portion of FIG. 2.

DETAILED DESCRIPTION OF AN EMBODIMENT

The present invention relates to an apparatus for helping to protect an occupant of a vehicle. In particular, the present invention relates to a vehicle occupant protection apparatus including a knee bolster movable from a stored position adjacent to an instrument panel of the vehicle to a blocking position spaced apart from the vehicle instrument panel. As representative of the present invention, FIG. 1 illustrates a vehicle occupant protection apparatus 10.

The protection apparatus 10 is mounted in a lower portion 14 of a vehicle instrument panel indicated schematically at 12. The lower portion 14 of the instrument panel 12 includes the portion of the instrument panel that a vehicle occupant's knees would contact were the occupant to slide forward from a seated position to contact the instrument panel.

The instrument panel 12 has an edge portion 16 (FIGS. 1 and 2) that defines a generally rectangular opening 18 in the instrument panel. The opening 18 provides access to a chamber 20 in the instrument panel 12.

An actuator indicated schematically at 22 is mounted in the chamber 20 in the instrument panel 12. The actuator 22 preferably includes an inflatable device in the form of an air bag illustrated schematically at 24, although other types of actuators can, alternatively, be used. The air bag 24 is in fluid communication with an inflator 26 that has one or more fluid outlets arranged to direct inflation fluid into the air bag 24.

The inflator 26 is electrically connected to an actuation circuit 28. The actuation circuit 28 includes a crash sensor, such as an inertia switch or an accelerometer, and a controller. Upon detection of a crash condition requiring occupant protection, as sensed by the crash sensor, the controller controls the actuation circuit 28 so that the actuation circuit sends an electric signal to the inflator 26 to actuate the inflator. When the inflator 26 is actuated, the inflator emits inflation fluid under pressure to inflate the air bag 24.

The protection apparatus 10 includes a knee bolster 30. The knee bolster 30 is configured to close the opening 18 in the instrument panel 12. In the illustrated embodiment, the knee bolster 30 has a generally rectangular configuration when viewed from the front or rear, as in FIG. 3, including parallel upper and lower edge portions 32 and 34 and parallel side portions 36 and 38. The knee bolster 30 has a somewhat curved configuration when viewed from the side, as seen in FIGS. 1 and 2, to fit the configuration of the lower portion 14 of the instrument panel 12. The knee bolster 30 has an inner major side surface 40 that is presented toward the actuator 22, and an outer major side surface 42 presented toward the vehicle occupant compartment.

The knee bolster 30 includes a relatively rigid metal substrate 44 and a plastic body portion or cover 50. The cover 50 is, preferably, made from a resilient material for cushioning contact between the knee bolster 30 and an occupant of the vehicle. Portions 52 of the plastic cover 50 extend through openings 54 in the metal substrate 44 and are heat staked to secure the plastic cover to the metal substrate.

The knee bolster 30 has a mounting portion 60 that is connected with the instrument panel 12. The mounting portion 60 of the knee bolster 30 includes four fastener openings 62, one located at each corner of the knee bolster. The fastener openings 62 are circular holes that extend through the material of the plastic cover 50. Each one of the fastener openings 62 is sized to receive a fastener in the form of a screw 76 (described below) for securing the knee bolster 30 to the instrument panel 12. The four fastener openings 62 are identical to each other.

The knee bolster cover 50 includes a reduced thickness portion 70 (FIG. 4) adjacent each fastener opening 62. The reduced thickness portion 70 is in the form of a circular groove, having a V-shaped cross-sectional configuration, extending completely around the fastener opening 62. The groove 70 is formed in the inner major side surface 40 of the cover 50. The groove 70 encloses and defines an annular securing portion 72 of the cover 50 that extends around the fastener opening 62. The securing portion 72 has the configuration of a washer. The reduced thickness portion 70 forms a tear seam in the cover 50 extending around the fastener opening 62. The tear seam or reduced thickness portion 70 is rupturable at a predetermined level of force. Identical tear seams 70 are formed at each one of the other three fastener openings 62 in the cover 50 and define identical annular securing portions 72 of the mounting portion 60 of the cover.

The protection apparatus 10 includes four identical fasteners 76. The fasteners 76 are preferably sheet metal screws, but could alternatively be another kind of fastener. Each fastener 76 extends through one of the fastener openings 62 in the knee bolster 30 and is secured in the instrument panel 12. Each fastener 76 has a first portion 78 fixed in the instrument panel 12, and a second portion 80 extending through its associated fastener opening 62 in the knee bolster 30. Each fastener 76 also includes a third portion 82 overlying a respective securing portion 72 of the cover 60 of the knee bolster 30. The third portion 82, or head, of the fastener 76 clamps the securing portion 72 of the cover 60 of the knee bolster 30 to the instrument panel 12 when the knee bolster is in the stored position illustrated in FIG. 1.

One or more tethers 90, which can be separate or formed as one piece, connect the knee bolster 30 with the instrument panel 12. When the knee bolster 30 is in the stored position, the tethers 90 are folded, as shown schematically in FIG. 1, between the knee bolster and the instrument panel 12. The knee bolster 30 when in the stored position closes the opening 18 in the instrument panel 12. The edge portions 32–38 of the knee bolster 30 abut or overlie the edge portion 16 of the instrument panel 12. The reduced thickness portions 70 of the cover 60 are not ruptured, and the securing portions 72 of the cover secure the knee bolster 30 to the instrument panel 12.

Upon detection of a crash condition requiring occupant protection, as sensed by the crash sensor in the actuation circuit 28, the inflator 26 is actuated. The inflation fluid emitted by the inflator 26 flows into the air bag 24 and inflates the air bag. The air bag 24 inflates in a rearward direction in the vehicle, that is, to the left in FIGS. 1 and 2. The inflating air bag 24 pushes outward, between the tethers 90, against the inner major side surface 40 of the knee bolster 80.

The inflating air bag 24 exerts a force on the knee bolster 30 that is greater than the predetermined force needed to rupture the reduced thickness portions 70 of the cover 50. The force of the inflating air bag 24 thus causes the cover 50 to rupture, or tear, at the four circular reduced thickness portions 70. When the cover 50 tears, the four annular securing portions 72 of the cover 50 remain clamped under the heads 82 of the fasteners 76, secured to the instrument panel 12. The remainder of the cover 50, however, is free to move away from the instrument panel 12.

The inflating air bag 24 moves the knee bolster 30 away from the instrument panel 12, from the stored condition shown in FIG. 1 to a blocking position as shown in FIG. 2. The knee bolster 30, when in the blocking position shown in FIG. 2, is positioned to contact the knees of a vehicle occupant and block further movement of the vehicle occupant in a forward direction in the vehicle. This blocking action can help to protect the vehicle occupant by preventing contact between the vehicle occupant and the instrument panel 12, and by preventing the vehicle occupant from "submarining" underneath an inflated air bag.

The tethers 90 control movement of the knee bolster 30 relative to the instrument panel 12 by limiting the amount of movement of the knee bolster away from the instrument panel. When the knee bolster 30 is in the blocking position, the tethers 90 are the only connection between the knee bolster 30 and the instrument panel 12.

From the above description of the invention, those skilled in the art will perceive improvements, changes and modifications in the invention. Such improvements, changes and modifications within the skill of the art are intended to be covered by the appended claims.

Having described the invention, we claim:

1. An apparatus for helping to protect an occupant of a vehicle having an instrument panel, said apparatus comprising:

a knee bolster movable in the vehicle from a stored position adjacent the instrument panel of the vehicle to a blocking position spaced apart from the vehicle instrument panel;

said knee bolster having at least one fastener opening and a tear seam extending around said one fastener opening, said tear seam defining and enclosing one securing portion of said knee bolster; and a fastener for releasably maintaining said knee bolster in the stored position adjacent to the instrument panel;

said one fastener extending through said one fastener opening in said knee bolster and overlying said one securing portion of said knee bolster;

said knee bolster rupturing at said tear seam in response to movement of said knee bolster from the stored position to the blocking position, said one securing portion of said knee bolster remaining secured to the instrument panel by said one fastener when said knee bolster moves from the stored position.

2. An apparatus as set forth in claim 1 further comprising an inflatable device which is inflatable against said knee bolster to move said knee bolster from the stored position to the blocking position, and at least one tether connected between said knee bolster and the instrument panel for controlling movement of said knee bolster relative to said attachment member.

3. An apparatus as set forth in claim 1 wherein said knee bolster comprises a plastic cover and a metal backer plate fixed to said cover, said one fastener opening being formed in said plastic cover.

4. An apparatus as set forth in claim 3 wherein said tear seam comprises a reduced thickness portion of said plastic cover, said reduced thickness portion being rupturable at a predetermined level of force to enable movement of said knee bolster from the stored position to the blocking position.

5. An apparatus as set forth in claim 1 wherein said one securing portion has an annular configuration.

6. An apparatus as set forth in claim 1 wherein said one fastener is a threaded fastener extending through said one fastener opening, said tear seam being circular in configuration.

7. An apparatus as set forth in claim 1 wherein said knee bolster has a plurality of fastener openings in addition to said one fastener opening;

said knee bolster having a plurality of tear seams in addition to said one tear seam, each one of said plurality of tear seams extending around a respective one of said plurality of fastener openings and defining and enclosing a respective securing portion of said knee bolster;

said apparatus further comprising a plurality of fasteners in addition to said one fastener, each one of said plurality of fasteners extending through a respective one of said plurality of fastener openings in said knee bolster and overlying a respective securing portion of said knee bolster;

said knee bolster rupturing at said one tear seam and at said plurality of tear seams in response to movement of said knee bolster from the stored position to the blocking position, all of said securing portions of said knee bolster remaining secured to the instrument panel by said fasteners when said knee bolster moves from the stored position.

8. An apparatus as set forth in claim 7 wherein each one of said securing portions has an annular configuration.

9. An apparatus as set forth in claim 7 wherein each one of said fasteners is a threaded fastener and each one of said tear seams is circular in configuration.

10. An apparatus for helping to protect an occupant of a vehicle having an instrument panel, said apparatus comprising:

a knee bolster movable in the vehicle from a stored position adjacent the instrument panel of the vehicle to a blocking position spaced apart from the vehicle instrument panel;

said knee bolster including a mounting portion having a first fastener opening, said mounting portion having a first tear seam extending around said first fastener opening, said first tear seam defining and enclosing a first securing portion of said mounting portion of said knee bolster; and a first fastener for releasably maintaining said knee bolster in the stored position adjacent to the instrument panel;

said first fastener having a first portion fixed in the instrument panel, a second portion extending through said first fastener opening in said mounting portion of said knee bolster, and a third portion overlying said first securing portion of said mounting portion of said knee bolster, said third portion of said first fastener clamping said first securing portion of said mounting portion of said knee bolster to the instrument panel when said knee bolster is in the stored position and when said knee bolster is in the blocking position;

said mounting portion tearing at said first tear seam and said first securing portion of said knee bolster remaining secured to the instrument panel by said first fastener in response to movement of said knee bolster from the stored position to the blocking position.

11. An apparatus as set forth in claim 10 wherein said first fastener is a threaded fastener having a shank portion and a head portion, said shank portion being fixed in the instrument panel and extending through said first fastener opening, said head portion clamping said first securing portion of said mounting portion of said knee bolster to the instrument panel when said knee bolster is in the stored position and when said knee bolster is in the blocking position.

12. An apparatus as set forth in claim 10 including a plurality of fasteners in addition to said first fastener and a plurality of fastener openings in addition to said first fastener opening, each one of said plurality of fasteners having a respective first portion fixed in the instrument panel, a respective second portion extending through a respective one of said plurality of fastener openings, and a respective third portion overlying said a respective securing portion of said mounting portion of said knee bolster, said third portions of said plurality of fasteners clamping said securing portions of said mounting portion of said knee bolster to the instrument panel when said knee bolster is in the stored position and when said knee bolster is in the blocking position;

said mounting portion tearing and said securing portions remaining secured to the instrument panel by said one fastener and by said plurality of fasteners in response to movement of said knee bolster from the stored position to the blocking position.

13. An apparatus for helping to protect an occupant of a vehicle having an instrument panel, said apparatus comprising:

a knee bolster movable in the vehicle from a stored position adjacent the instrument panel of the vehicle to a blocking position spaced apart from the vehicle instrument panel, said knee bolster comprising a plastic cover and a metal backer plate fixed to said cover;

said plastic cover having a plurality of fastener openings through which are extensible a plurality of fasteners for releasably maintaining said knee bolster in the stored position adjacent the instrument panel;

said cover having a plurality of reduced thickness portions each one of which extends around a respective one of said fastener openings, each one of said reduced thickness portions being rupturable at a predetermined level of force; and said plastic cover portion of said knee bolster rupturing at said reduced thickness portions to enable movement of said knee bolster from the stored position to the blocking position in response to the application to said knee bolster of force exceeding said predetermined level of force.

14. An apparatus as set forth in claim 13 wherein said reduced thickness portions of said plastic cover are circular in configuration.

15. An apparatus as set forth in claim 14 wherein said reduced thickness portions of said plastic cover are spaced apart around the periphery of said knee bolster.

* * * * *